United States Patent
Sebastian et al.

(10) Patent No.: US 6,824,085 B2
(45) Date of Patent: Nov. 30, 2004

(54) FUEL INJECTOR

(75) Inventors: Thomas Sebastian, Stuttgart (DE); Jens Pohlmann, Schwieberdingen (DE); Martin Maier, Moeglingen (DE); Guenter Dantes, Eberdingen (DE); Detlef Nowak, Untergruppenbach (DE); Joerg Heyse, Besigheim (DE); Joerg Schlerfer, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 10/169,619

(22) PCT Filed: Oct. 15, 2001

(86) PCT No.: PCT/DE01/03889

§ 371 (c)(1),
(2), (4) Date: Nov. 5, 2002

(87) PCT Pub. No.: WO02/31353

PCT Pub. Date: Apr. 18, 2002

(65) Prior Publication Data

US 2003/0116659 A1 Jun. 26, 2003

(30) Foreign Application Priority Data

Oct. 13, 2000 (DE) .......................................... 100 50 751

(51) Int. Cl.$^7$ .............................. B05B 1/30; B05B 1/34; F02M 39/00

(52) U.S. Cl. ................. 239/585.1; 239/486; 239/585.5; 239/533.3; 239/533.12; 239/533.2

(58) Field of Search ........................ 239/533.12, 533.14, 239/585.1–585.5, 88–93, 533.2, 533.3, 463, 466, 468, 472, 483, 486; 251/129.15, 129.21, 127

(56) References Cited

U.S. PATENT DOCUMENTS

| | | | | |
|---|---|---|---|---|
| 4,566,634 A | * | 1/1986 | Wiegand | 239/410 |
| 4,715,541 A | * | 12/1987 | Freudenschuss et al. | 239/533.4 |
| 5,713,327 A | * | 2/1998 | Tilton et al. | 123/299 |
| 5,826,798 A | * | 10/1998 | Schindler et al. | 239/403 |
| 5,860,600 A | * | 1/1999 | Schindler et al. | 239/463 |
| 5,979,801 A | * | 11/1999 | Munezane et al. | 239/533.12 |
| 6,065,692 A | * | 5/2000 | Brinn, Jr. | 239/533.12 |
| 6,105,884 A | | 8/2000 | Molnar et al. | |
| 6,257,496 B1 | * | 7/2001 | Wyant | 239/5 |

FOREIGN PATENT DOCUMENTS

| | | |
|---|---|---|
| DE | 39 39 093 | 5/1991 |
| DE | 39 40 585 | 6/1991 |
| DE | 41 31 499 | 4/1993 |
| DE | 42 31 448 | 10/1993 |
| DE | 198 04 463 | 8/1999 |
| WO | WO 99 00201 | 1/1999 |

* cited by examiner

*Primary Examiner*—Davis Hwu
(74) *Attorney, Agent, or Firm*—Kenyon & Kenyon

(57) ABSTRACT

A fuel injector, in particular for direct injection of fuel into the combustion chamber of an internal combustion engine, includes a valve-closure member which forms a sealing seat together with a valve-seat surface which is formed on a valve-seat member, and several injection orifices, each of which is connected with at least one spiral groove so that an outer edge of the swirl grooves coincides in part with a circumferential edge of the injection orifices. The swirl grooves extend generally perpendicular to a center line of the injection orifice associated with them.

9 Claims, 2 Drawing Sheets

FUEL INJECTOR

FIELD OF THE INVENTION

The present invention relates to a fuel injector.

BACKGROUND INFORMATION

Japanese Registered Utility Model 63-133260 describes a fuel injector which is distinguished by the presence of several injection orifices in a valve-seat member. Swirl grooves are provided in an inner wall, through which fuel which flows in through feed lines is injected with a swirl. This permits more rapid atomization of the fuel and improved atomization and mixing performance, while the adhesion of fuel to the injection hole walls is reduced, so that the concentration of hydrocarbons in the exhaust gas may be lowered.

German Patent Application 41 31 499 describes a fuel injector which is provided with four swirl channels in a swirl section outside of a sealing surface. The channels discharge into an injection channel at a lateral distance from a longitudinal valve axis.

One disadvantage in the conventional fuel injectors described above is in particular the incomplete generation of swirl, which does not extend to all of the fuel, since part of it flows through the injection holes parallel to the axis. That causes uncontrollable divergences in the shape and the apex angle of the conical mixture cloud, leading to incomplete combustion.

German patent Application No. 198 04 463 describes a fuel injection system having an injection nozzle which injects fuel into a combustion chamber formed by a piston and cylinder assembly and provided with a spark plug which extends into the combustion chamber. The injection nozzle has at least one row of injection holes, distributed around the circumference of the injection nozzle. By aiming the injection of fuel through the injection holes, jet-controlled combustion behavior is implemented by forming a mixture cloud having at least one jet which is directed in the direction of the spark plug to ignite, and having additional jets which form a mixture cloud which is at least approximately closed, i.e., contiguous.

SUMMARY

A fuel injector according to an example embodiment of the present invention has the advantage that the swirl is generated even as the fuel flows to the injection openings and may be further reinforced and homogenized by the swirl grooves which extend into the injection orifices. The swirl grooves in the face of the valve-seat member are designed so that they are as nearly perpendicular to a center line of the respective injection orifice.

The design of the fuel injector according to the example embodiment of the present invention allows the advantages of a multiple-orifice fuel injector to be combined with those of an injector having swirl conditioning, so that the respective disadvantages of the individual designs may be eliminated.

It may be advantageous that, in the example embodiment, the swirl grooves discharge into the injection orifices at any angle desired relative for example to a circumferential direction of the fuel injector but open into the injection orifices perpendicular to the center line of the injection orifices. This enables the orientation to be adapted for various types of fuel infeed.

The number of injection orifices and of the corresponding swirl grooves may be chosen freely and may be adapted easily to the fuel injector.

BRIEF DESCRIPTION OF THE DRAWINGS

One embodiment of the present invention is illustrated in simplified form in the drawing and explained in greater detail in the following description.

DETAILED DESCRIPTION

Figure 1:
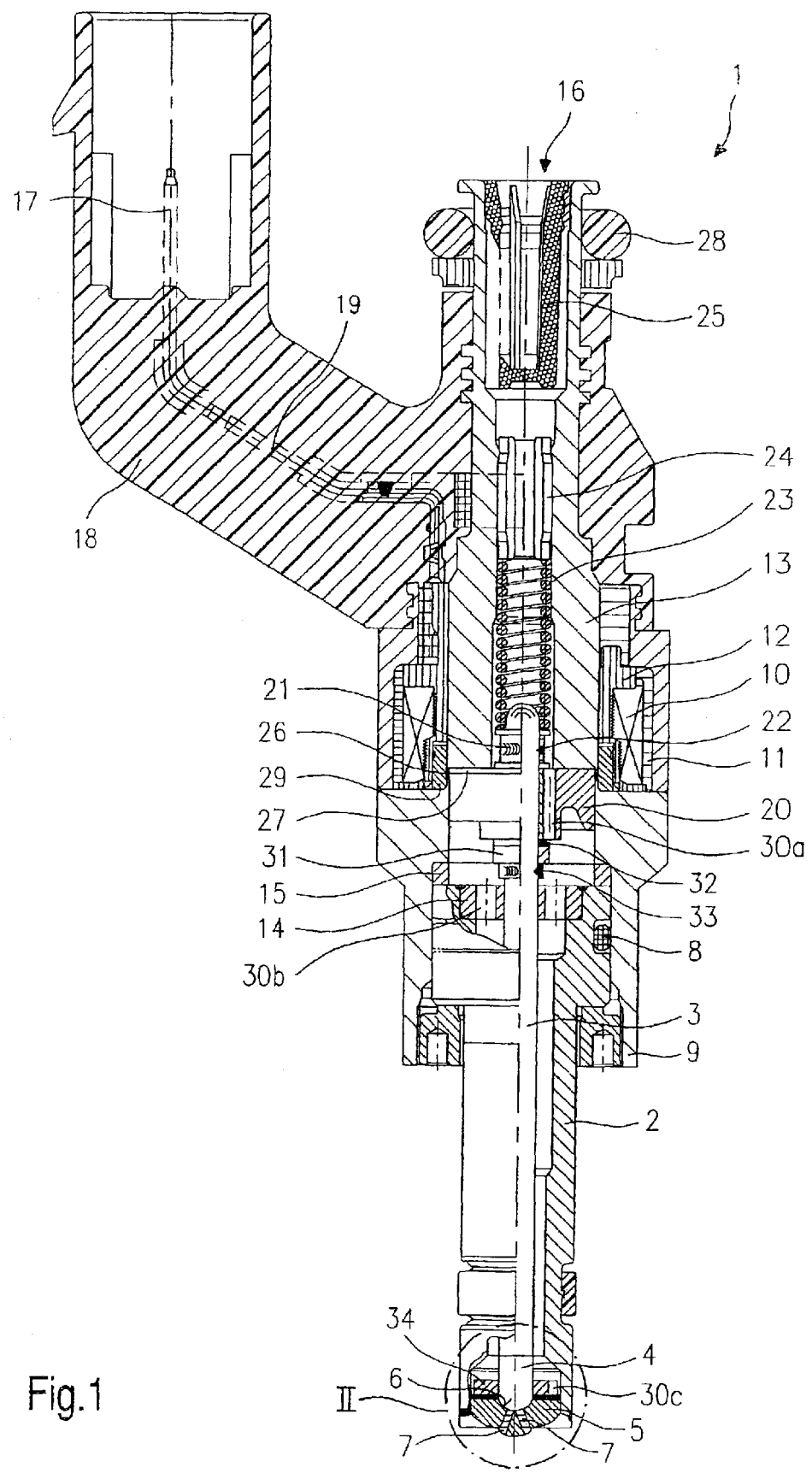
FIG. 1 shows a schematic section through an embodiment of a fuel injector designed according to the present invention.

A fuel injector 1 shown in FIG. 1 is designed in the form of a fuel injector 1 for fuel injection systems of combustion engines having fuel mixture compression and spark ignition. Fuel injector 1 is suitable in particular for direct injection of fuel into the combustion chamber (not shown) of an internal combustion engine.

Fuel injector 1 is made of a nozzle body 2 in which a valve needle 3 is situated. Valve needle 3 is mechanically linked to a valve-closure member 4, which cooperates with a valve-seat surface 6 on a valve-seat member 5 to form a sealing seat. Valve-seat member 5 may be placed in a recess 50 in the nozzle body. In this embodiment, fuel injector 1 is an inwardly opening fuel injector 1 which has several injection orifices 7. Nozzle body 2 is sealed by a gasket 8 from stationary pole 9 of a solenoid 10. Solenoid 10 is encapsulated in a coil housing 11 and wound onto a field spool 12, which is in contact with an internal pole 13 of solenoid 10. Internal pole 13 and stationary pole 9 are separated from each other by a gap 26 and are supported on a connecting component 29. Solenoid 10 is energized by an electric current that may be supplied through an electric plug-in contact 17 via a line 19. Plug-in contact 17 is enclosed by plastic sheathing 18, which may be integrally molded on internal pole 13.

Valve needle 3 is guided in a disk-shaped valve needle guide 14. A matching adjusting disk 15 is used to adjust the lift. An armature 20 is situated on the other side of adjusting disk 15. Via a first flange 21, the armature is frictionally engaged with valve needle 3, which is joined by a weld 22 to first flange 21. A restoring spring 23, which is pre-stressed by a sleeve 24 in the present design of fuel injector 1, is supported on first flange 21. To guide the valve needle 3 a guide element 34 is provided in the area of the sealing seat; guide element 34 may be designed for example as a cardanic valve needle guide, to prevent eccentricity and tilting of valve needle 3.

A second flange 31, which is connected to valve needle 3 by a weld 33, serves as the lower armature stop. An elastic intermediate ring 32 which rests on the second flange 31 prevents rebounding when injector 1 closes.

Fuel channels 30a to 30c run through valve needle guide 14, armature 20 and guide element 34. The fuel is fed in through a central fuel supply system 16 and filtered through a filter element 25. Fuel injector 1 is sealed from a fuel line (not shown) by a gasket 28.

In a face 35 on the infeed side of valve-seat member 5 adjacent to infeed-side ports 36 of the injection orifices 7 are swirl grooves 37a, which are incorporated into the surface of valve-seat member 5 for example by stamping or laser processing. Swirl grooves 37a on the surface of valve-seat member 5 preferably continue in swirl grooves 37b in injection orifices 7, running helically on inner walls 42 of injection orifices 7 and extending as far as outflow-side discharge holes 43 of injection orifices 7. A detailed representation of swirl grooves 37a and 37b may be seen in FIGS. 2 and 3.

In the resting state of fuel injector 1, armature 20 is acted upon by restoring spring 23 against its direction of lift, so that valve-closure member 4 is held in sealing contact on valve seat 6. When solenoid 10 is energized, it builds up a magnetic field which moves armature 20 in the direction of lift against the elastic force of restoring spring 23, the lift being predetermined by a working gap 27 between internal pole 12 and armature 20 in the resting position. Armature 20 also entrains flange 21, which is welded to valve needle 3, in the direction of lift. Valve-closure member 4, which is connected to valve needle 3, is lifted up from valve-seat surface 6, and fuel is injected.

When the coil current is turned off, armature 20 drops back from internal pole 13 due to the pressure of restoring spring 23 after the magnetic field has decayed sufficiently, so that flange 21 which is connected to valve needle 3 moves against the direction of lift. Valve needle 3 is thus moved in the same direction, so that valve-closure member 4 is set down on valve-seat surface 6 and fuel injector 1 is closed.

Figure 2:
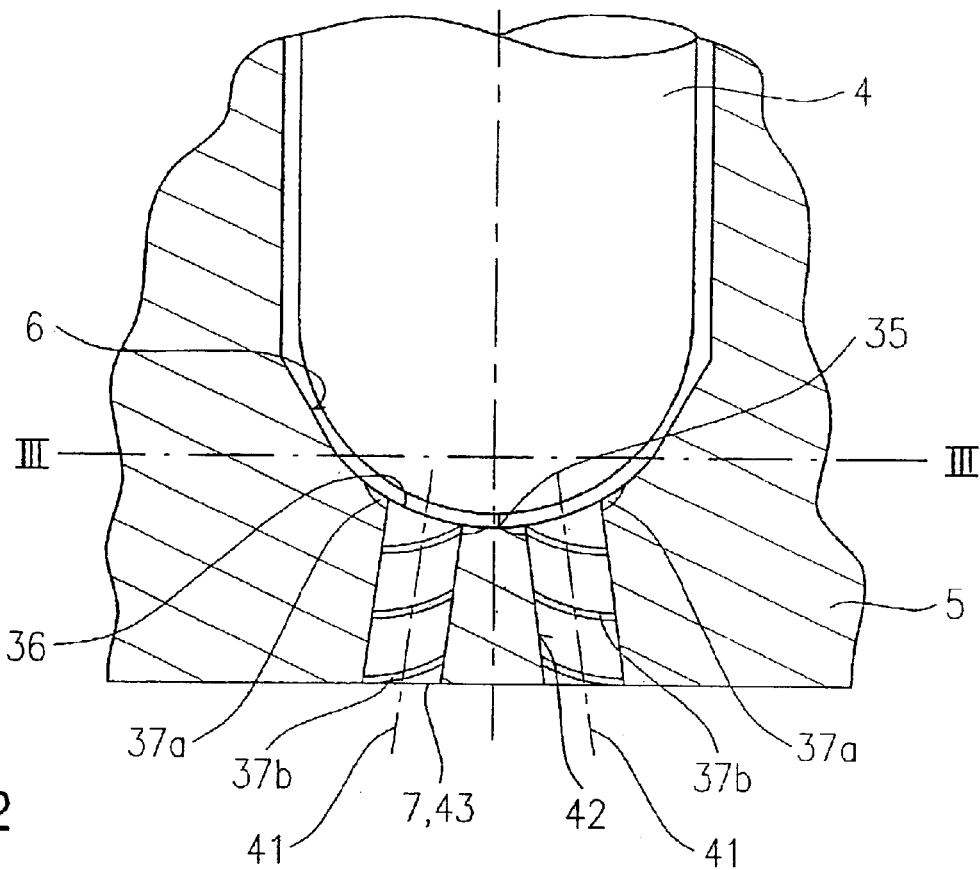
FIG. 2 shows a schematic detail of the fuel injector designed according to the present invention shown in FIG. 1, in area II of FIG. 1.

FIG. 2 shows a schematic detail of fuel injector 1 designed according to the present invention, illustrated in FIG. 1. Equivalent components are labeled with corresponding reference symbols.

After passing through the sealing seat, the fuel flowing through fuel injector 1 reaches infeed-side face 13 of valve-seat member 5, in which injection orifices 7 are formed. The fuel first enters swirl grooves 37a which are formed in end face 35, thereby acquiring a swirl. Swirl grooves 37a are at least nearly perpendicular to a center line 41 of injection orifices 7, and run parallel to end face 35 of valve body 5. Swirl grooves 37a then preferably continue uninterrupted in swirl grooves 37 in injection orifices 7, where they run helically on an inner wall 42 of injection orifices 7 in an outflow direction until they reach downstream-side discharge holes 43 of injection orifices 7. Downstream-side discharge holes 43 preferably discharge directly into the combustion chamber (not shown) of the engine.

The swirl generated by swirl grooves 37a running on end face 35 is reinforced and homogenized by the passage of the fuel through injection orifices 7, which are continuations of swirl grooves 37b. Consequently, with proper selection of the arrangement of injection orifices 7, a homogenous stoichiometric mixture cloud may be produced in the combustion chamber.

Figure 3:
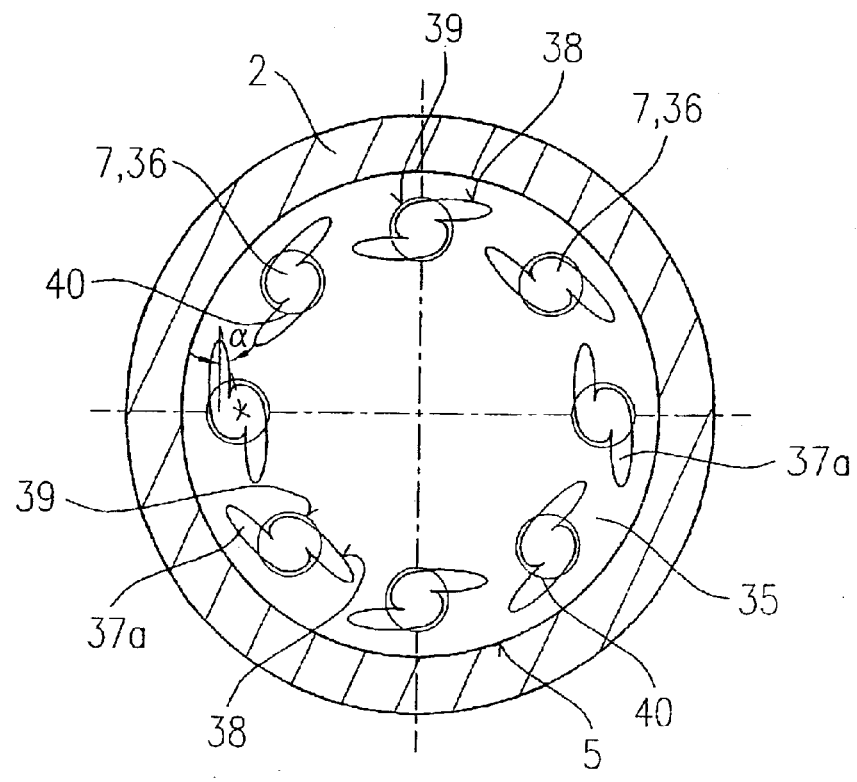
FIG. 3 shows a schematic section through the fuel injector according to the present invention along line III—III in FIG. 2.

FIG. 3 shows a detailed sectional view along line III—III through the embodiment of a fuel injector 1 according to the present invention described in FIG. 2. The viewing direction corresponds to the direction of flow of the fuel.

The section shown, through the injection end of fuel injector 1, shows a top view of infeed-side surface 35 of valve-seat member 5 with infeed-side ports 36 of injection orifices 7. In the example embodiment there are eight injection orifices 7 arranged in a circle which is concentric with the circumference of valve-seat member 5.

In the example embodiment, there are two swirl grooves 37a discharging into infeed-side port 36 of each injection orifice 7, each oriented in the same way relative to ports 36, each having an outer edge 38 in contact with a circumferential edge 39 of injection orifices 7. One spiral groove 37a is always formed on radial inner edge 39 and one on radial outer edge 39 of injection orifices 7. Hence, in the present embodiment swirl grooves 37a discharge into injection orifices 7 separated 180° from each other.

In the area of inlets 40 of swirl grooves 37a into injection orifices 7, circumferential edge 39 of injection orifices 7 is lowered, so that the fuel passing through swirl grooves 37a may flow unhindered through inlets 40 into injection orifices 7 and into helically continuing swirl grooves 37 on inner walls 42 of injection orifices 7.

To enable swirl grooves 37a formed in end face 35 to impart a swirl to the fuel flowing to injection orifices 7, valve-closure member 4 must be held at a sufficiently close distance from valve-seat member 5 when fuel injector 1 is open, since otherwise the fuel flows into injection orifices 7 nearly uninfluenced. Reinforcement of the swirl may also be achieved through the depth of swirl grooves 37a in infeed-side end face 35 of valve seat member 5. The depth of swirl grooves 37a preferably varies here over their length, being greatest in the area of inlets 40.

Swirl grooves 37a and 37b may be produced by various machining methods. The removal of material from end face 35 of valve-seat member 5 and from inner walls 42 of injection orifices 7 by laser processing or erosion is particularly advantageous.

It is possible to produce especially swirl grooves 37a formed in end face 35 in the desired manner inexpensively by stamping with appropriate dies while valve-seat member 5 is being manufactured.

The present invention is not confined to the embodiments shown, and may also be used for example for fuel injectors 1 with a smaller or larger number of injection orifices 7 in a freely chosen arrangement, as well as for a larger or smaller number of swirl grooves 37a and 37b. It is possible, for example, to form several concentric rings of injection orifices 7, the outer ones having more swirl grooves 37a and 37b than the inner ones. Furthermore, the invention is suitable for any desired type of fuel injector.

What is claimed is:

1. A fuel injector for direct injection of fuel into a combustion chamber of an internal combustion engine, comprising:
    a valve closure member;
    a valve-seat member having a valve-seat surface forming a sealing seat for the valve closure member, the valve-seat member including a plurality of injection orifices, each respective one of the injection orifices being connected to a swirl groove so that an outer edge of the swirl groove coincides in part with a circumferential edge of the respective one of the injection orifices, the swirl groove extending perpendicular to a center line of the respective one of the injection orifices.

2. The fuel injector according to claim 1, wherein each swirl groove discharges into the respective one of the injection orifices at an angle.

3. The fuel injector according to claim 1, wherein each swirl groove is incorporated into an infeed-side end face of the valve-seat member by one of stamping, erosion or laser processing.

4. The fuel injector according to claim 1, wherein an axial depth of each swirl groove increases in a direction of the respective one of the injection orifices.

5. The fuel injector according to claim 4, wherein each swirl groove discharges into the respective one of the injection orifices via an inlet at which the axial depth of the swirl groove is greatest.

6. The fuel injector according to claim 1, wherein the swirl groove continues as a swirl groove into the respective one of the injection orifices.

7. The fuel injector according to claim 6, wherein each swirl groove in the respective one of the injection orifices runs helically on inner walls of the injection orifices.

8. The fuel injector according to claim 6, wherein each swirl groove extends from an infeed-side port of the injection orifices to a downstream-side discharge holes.

9. The fuel injector according to claim 1, wherein the injection orifices are arranged in a circle concentric with a circumference of the valve-seat member.

* * * * *

UNITED STATES PATENT AND TRADEMARK OFFICE
CERTIFICATE OF CORRECTION

PATENT NO. : 6,824,085 B2
DATED : November 30, 2004
INVENTOR(S) : Thomas Sebastian et al.

It is certified that error appears in the above-identified patent and that said Letters Patent is hereby corrected as shown below:

<u>Column 1,</u>
Line 19, change "German Patent Application" to -- German Patent No. --.
Line 25, delete "in particular".

<u>Column 2,</u>
Line 26, change "Fuel injector 1 is made of" to -- Fuel injector 1 includes --.

<u>Column 3,</u>
Line 62, change "example embodiments" to -- exampe embodiments, --.

<u>Column 4,</u>
Line 5, change "embodiment swirl grooves" to -- embodiment, swirl grooves --.
Line 15, change "member 4 must be held" to -- member 4 is held --.
Line 40, change "the invention" to -- the present invention --.

Signed and Sealed this

Twenty-first Day of March, 2006

JON W. DUDAS
*Director of the United States Patent and Trademark Office*